K. TYSDAL.
Barbed Fence-Wire.

No. 208,001. Patented Sept. 10, 1878.

Witnesses
Aed. G. Dieterich
Jno. W. Madigan

Inventor
Knud Tysdal
by Louis Bagger & Co.
his Attorneys

UNITED STATES PATENT OFFICE.

KNUD TYSDAL, OF LEE, ILLINOIS, ASSIGNOR OF FOUR-FIFTHS OF HIS RIGHT TO THEODORE O. BERG, LEWIS TYSDAL, JOHN TYSDAL, AND OSMAND TYSDAL, (ONE-FIFTH TO EACH,) ALL OF SAME PLACE.

IMPROVEMENT IN BARBED FENCE-WIRE.

Specification forming part of Letters Patent No. 208,001, dated September 10, 1878; application filed July 31, 1878.

*To all whom it may concern:*

Be it known that I, KNUD TYSDAL, of Lee, in the county of Lee and State of Illinois, have invented certain new and useful Improvements in Barbed Fence-Wire; and I do hereby declare that the following is a full, clear, and exact description thereof, which will enable others skilled in the art to which it appertains to make and use the same, reference being had to the accompanying drawings, which form a part of this specification, and in which—

Figure 1:
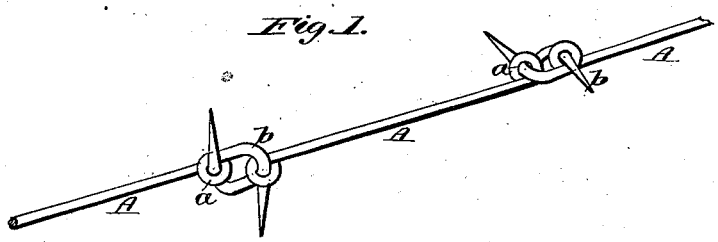
Figure 2:
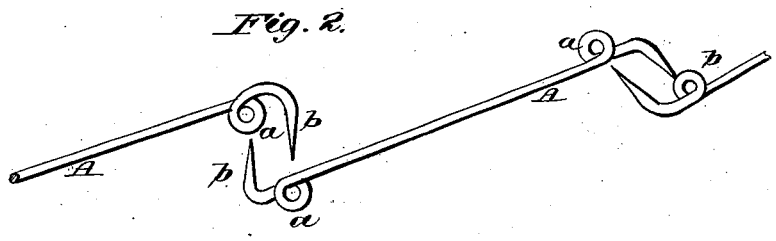
Figure 3:
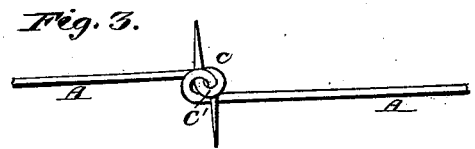

Figure 1 is a perspective view of my improvement in wire or barb fences. Fig. 2 is a similar view, showing the formation of the uniting-loops of the sections of the fence; and Fig. 3 is a modification of my improvement.

Corresponding parts in the several figures are denoted by like letters.

This invention has particular reference to that class of fences termed "wire" or "barb" fences, its object being to provide against the rubbing or pressing against the fence by cattle or animals to prevent the knocking down of the same or its being otherwise damaged.

The nature of this invention consists in looping the wire of the fence at a point a short distance from its end or ends, and thence bending it at a right angle. By similarly treating the ends of all the sections of the fence, with the bent or right-angled portion of the meeting ends of each extended in opposite directions, the said bent or right-angled portions can be passed, one through the loop or eye of the adjoining section of wire or fence, and the other through the eye or loop of the section adjacent to it, the respective sections of the fence being thus united together. To more securely connect them together, the right-angled portions may be bent in a direction with reference to the loops or eyes that will lock them therein.

In the drawing, A designates one or more wire sections of a fence. The wire A is looped or formed with an eye, *a*, at a point in proximity with each end, as clearly shown in the drawing. Beyond these loops or eyes the wire is bent at right angles, as at *b b*, which bent or right-angled portions *b* are pointed or sharpened to prick the cattle or animal in the event of the latter approaching too near the fence, to keep them off or from knocking the fence down, or prevent its being otherwise damaged. The right-angled portions of the adjoining sections of wires are extended in opposite directions, as seen in the figures of the drawing, and those meeting the section or wire A are inserted through its loops or eyes *a a*, while their eyes receive the hooks or right-angled portions *b b* of the wire A, thus interlocking with each other and uniting the respective sections together. The right-angled portions *b* may be bent, with reference to the eyes or loops, so as to prevent the possibility of their detachment therefrom.

In the modification shown in Fig. 3, the end of the wire is curved, as at *c*, with its part *c'* curved slightly backward, and thence extended outwardly at a right angle. By bringing two of such curved or looped portions together a locking joint or connection between the wires of the fence is formed, and also a strong and secure one.

Having thus fully described my invention, I claim and desire to secure by Letters Patent—

In a wire barbed fence, the wires or metallic strands A, provided with loops or eyes *a a*, and bent at right angles to the line of the wire, and this portion of each wire inserted in the loop of the other wire, as set forth.

In testimony that I claim the foregoing as my own I have hereunto affixed my signature in presence of two witnesses.

KNUD TYSDAL.

Witnesses:
THEODORE O. BERG,
JOHN TYSDAL.